Dec. 26, 1972 J. C. BOGUE ET AL 3,707,405

SEQUENTIALLY ENERGIZED BATTERY

Filed July 8, 1970

INVENTORS
JOHN C. BOGUE
ROBERT I. SARBACHER

United States Patent Office 3,707,405
Patented Dec. 26, 1972

3,707,405
SEQUENTIALLY ENERGIZED BATTERY
John C. Bogue and Robert I. Sarbacher, Santa Monica, Calif., assignors to John C. Bogue, Santa Monica, Calif.
Filed July 8, 1970, Ser. No. 53,096
Int. Cl. H01m 1/04
U.S. Cl. 136—173       11 Claims

ABSTRACT OF THE DISCLOSURE

A sequentially energized battery, particularly adapted for intermittent use, has an extremely long standby life and will supply power intermittently over its energy capability without deterioration of the unused energy contained within it. A series of mechanically actuated electrochemical reserve cells are controlled by a selective activation device, so that each reserve cell of the series is activated only after the preceding cell has substantially spent its useful life. In applications where a relatively small amount of energy is needed intermittently, as with flashlights, it is only necessary to energize as many cells of the sequential battery as are required for the particular use.

BACKGROUND OF INVENTION

There are a number of instances where a standby source of electric power is needed so that power is available when required, but, where the total quantity of power required over a given period of time is not great. A flashlight is an example where such a standby source is often required. The flashlight may be resting unused for many months or years before required. Often on such occasions, the batteries contained therein are completely exhausted when the flashlight is needed. Further, on some occasions, due to expansion and corrosion of the batteries, the inside of the flashlight is so eaten away that it is of no further value.

SUMMARY OF THE INVENTION

The present invention relates generally to battery power supplies and, more particularly, it relates to such power supplies whose shelf life, prior to activation, is essentially unlimited and whose standby life, once activated, is that of an ordinary battery used in the system. One aspect of the sequentially energized battery of the present invention is the use of reserve or dry charged secondary batteries which are well known in the art. They are batteries wherein the electrodes are fully assembled for operation, but the electrolyte is held in reserve in a separate container which may be within the battery housing. Since there is no consumption of the electrodes under these circumstances, the shelf life of the battery is essentially infinite. However, once the electrolyte is released from the reserve container, such as by mechanical rupture or any other means as are well known in the art, the battery is activated and thereafter has a limited standby life.

In accordance with the present invention a series of reserve primary cell batteries, or dry charged secondary batteries are employed in combination with a selective activation device. When all batteries of the system are in reserve status, the shelf life of the sequential battery is practically indefinite. However, once the first battery is activated, its standby life is limited. When this battery has become exhausted, the next battery in the sequence may be similarly energized. If its energy is consumed in the particular application to which it is subjected, the third cell may be energized as before. This process may be repeated to meet the power requirements of the particular occasion. The standby life of the last cell energized is limited but since the next application of the power supply may be months or several years away, during this time the last cell energized may have lost all its energy due to the continuing action of the electrolyte. However, the remaining cells contain their full energy until the next use. In this way it is possible to have the remaining energy of the battery available for many years. The total standby life of the battery is a function of the standby characteristic of the individual batteries and the number of the cells in the series. A form of battery construction is described and a mechanical method is described through which the various cells in the sequential battery may be energized. The mechanical energizing method employs a small screw which may be turned to break the seal between the electrolyte compartment and the battery plate compartment. This screw simultaneously makes contact with the cell electrodes so as to electrically connect the cell into the circuit of a flashlight. When this cell has spent its energy, the screw may be turned in the opposite direction, moved into another notch and screwed down so as to energize the next cell in the sequence. Additional cells may be energized in the same way when the energy contained in the preceding cell has been consumed. A guide is provided in this device to assist in the guiding of the energizing screw.

Thus the next cell in the series is activated to provide the necessary electrical energy until its useful life approaches an end, where upon, the next cell may be mechanically activated by moving the screw to the proper position wherein the next cell is substituted in place of the preceding one.

DESCRIPTION OF THE DRAWINGS

Specific features of the invention will become readily apparent from the following detailed description when read in conjunction with the annexed drawings in which.

DETAILED DESCRIPTION OF THE INVENTION

For the purposes of illustration, the present invention is described herein as embodied in a magnesium/magnesium perchlorate/mercuric-oxide cell; however, the features of this invention are in no way limited to this cell in that this is a primary cell and the invention is equally applicable to secondary cells as well as other types of primary cells.

Figures 1A, 1B:
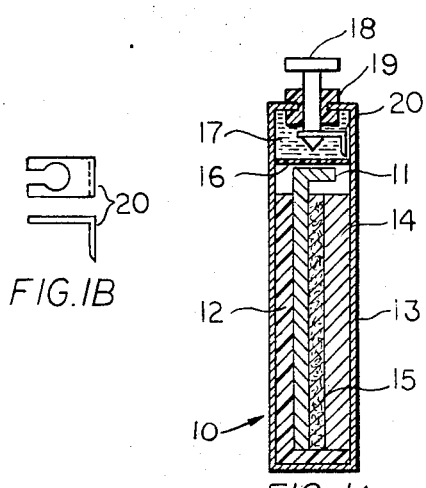
FIG. 1A shows a cross sectional view of the disc construction of one of the cells of the battery in accordance with the present invention.
FIG. 1B shows a detail of the bracket employed to pierce the diaphragm holding the electrolyte separate from the electrode compartment of the cell.

In the schematic illustration of FIG. 1A a single cell 10 of the sequence is only schematically represented because various structures therefore are well known in the art and the details thereof are not material to the present invention.

The anode 11 of cell 10 is formed from magnesium sheet stock such as produced by Dow Chemical Company, under the designation AZ–21 or AZ–31, preferably about 0.018 inch in thickness. The cathode 13 comprises a stainless steel case approximately 0.005 inch thick and forms a structural base element which also serves as the container for the cell. The inside surface of this electrode is coated with a mercuric-oxide paste 14. A thin absorbent fibrous separator 15 which may be of filter paper stock, is interposed between the anode 11 and the cathode 13 and carries the electrolytic solution when activated. A detail of the bracket 20 is shown in FIG. 1B.

Figure 2:
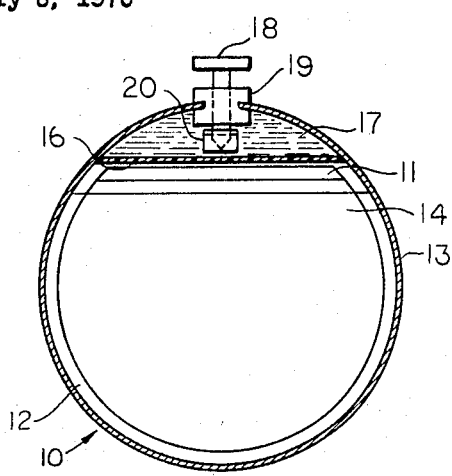
FIG. 2 is an elevation view of a cell of this invention with one face of the battery case or cathode cut away.

The physical structure of the cell is further illustrated in the cross sectional view shown in FIG. 2. In addition to the electrodes and materials contained in the cell, a compressible plastic material such as polyurethane foam plastic, 12, is inserted for the purposes of insulating the anode 11 from the walls of the cell and to prevent expansion of the cell from distorting the configuration of the disk shaped container 13 which serves as the cathode. The mercuric-oxide paste 14 is prepared by mixing mercuric-oxide with carbon black to improve conduction, in the weight ratio of about 9.5 to 1, together with a small amount of suitable binder, such as about 0.05% by weight of carboxymethylcellulose. This mixture is ball mill dried for about an hour and then enough water is added to make a thick paste and it is further ball milled for an additional hour. The resultant mixture is spread in a thin layer about $\frac{1}{32}$ inch thick on the separator 15 before inserting in the cell and dried in an oven at about 150 degrees F. for about 30 minutes.

A thin plastic membrane 16 is inserted in the cell and creates a crescent-shaped compartment in which the electrolyte 17 is stored. A plunger 18 is inserted through a hole in the container which plunger is insulated from the container by the flexible plastic grommet 19. One end of the plunger 18 has a sharp point designed so that when depressed it makes electrical contact with the anode 11 after breaking through the plastic diaphragm 16.

In order to reelase the electrolyte into the plate compartment of the cell quickly a small bracket 20 is clipped to the plunger 18 to fit into a circular slot in the end of the plunger 18. Thus, when the plunger is depressed, the bracket 20 cuts through the diaphragm 16 releasing the electrolyte and energizing the cell.

Figure 3:
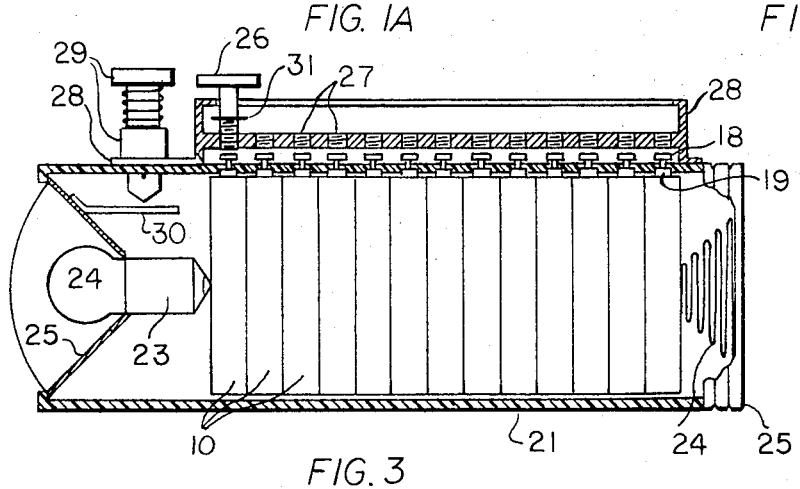
FIG. 3 shows a longitudinal cross sectional view of the cells assembled in a flashlight together with the means of activating the individual cells mechanically in accordance with the principles of the present invention.

The disk as formed by the cell may be constructed quite thin so that a number of them can be stacked as shown in FIG. 3. In manufacture, the cathode case 13 can be made in two or more parts for ease in assembly. The cells as shown in FIGS. 1A and 2 must be held in a vertical position in order that, when the diaphragm 16 is broken, the electrolyte will flow into the separator 15 under the action of gravity. Modified designs for the cell can avoid this requirement.

Figure 4:
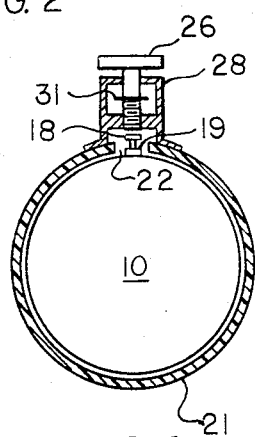
FIG. 4 shows a cross sectional view of the battery compartment of the flashlight.

FIGS. 3 and 4 show diagrammatically two views of an assembled series of cells 10 in a flashlight case 21. The cells 10 are slipped into the case 21 so that the plunger 18 passes or is guided through a slot 22 in the case 21. The case 21 is made of insulating material such as non-conducting plastic. The series of cells are held against the lamp socket 23 by the pressure created by the spring 24 attached to the screw cap 25 in a manner well known in the art. This holds the cell cases in contact with one another and with one terminal of the lamp 24 screwed into the socket 23. The other terminal of the lamp is connected to the reflector 25. When the screw 26 is screwed into any one of the threaded holes 27, the plunger 18 is depressed and brought in contact with the anode 11, actuating the cell 10 concerned and making electrical connection to the frame 28 which is mechanically and electrically attached to the switch 29. When the switch 29 is depressed, it makes contact with the flange 30 which is mechanically and electrically attached to the reflector 25, so as to complete the electrical circuit and light the lamp 24.

Figure 5:
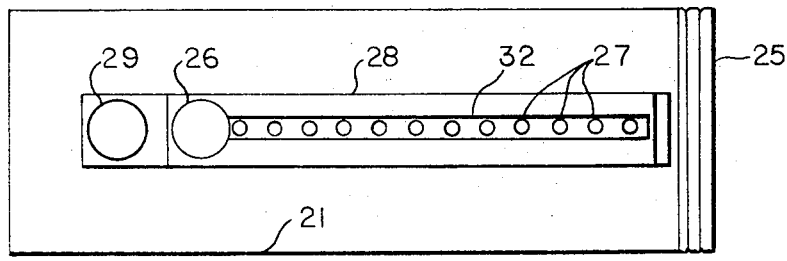
FIG. 5 shows another view of the mechanical actuating device embodying the principles of the present invention.

FIG. 5 shows a top view of the flashlight container 21 wherein the switch 29 and the screw 26 are indicated. Each threaded hole 27 represents access of the screw 26 to the plunger 18 which, when depressed firmly, actuates the individual cells. In order to prevent the screw 26 from being lost, a small disk 31 is attached to it. This metallic disk 31 is placed on the shaft of the screw 26 in such a way that when the screw 26 is unscrewed from the threaded hole 27, it may be moved to another threaded hole in order to energize an additional cell and disconnect the last cell energized from the electrical circuit. The slot 32 assists in guiding the screw 26 to the correct position when moving from one cell to another.

The action of depressing the plungers 18 in the cells 10 may be effected by spring action or by other means. However, for the purpose of describing the principles of this invention, the method selected was chosen.

Having thus described the present invention by reference to a specific embodiment thereof, it is not intended that the invention be limited thereto for numerous variations and modifications will be apparent to those skilled in the art. Such modifications and variations as are embraced by the spirit and scope of the appended claims are contemplated as being within the purview of the present invention.

What is claimed is:

1. A power supply comprising:
   a plurality of normally inactive cells;
   separate means for activating each cell; and
   means for individually actuating, one at a time, said separate means for activating each cell, said means for individually actuating said separate activating means being brought into and held in electrical contact with each cell upon activation of that cell.

2. A power supply as defined in claim 1 wherein said plurality of cells are reserve primary cells.

3. A power supply as defined in claim 1 wherein said means for individually actuating said separate activating means includes a plurality of holes, one over each cell of said plurality of cells and a single male member arranged for insertion into said holes, one at a time.

4. A power supply as defined in claim 3 wherein said holes are threaded and said male member is a screw.

5. A power supply as defined in claim 4 wherein said separate means for activating said cells each includes a plunger.

6. A power supply as defined in claim 5 wherein each cell of said plurality of cells is provided with a compressible insulating material to absorb any excessive pressure created by gas or electrode expansion to thereby preserve the shape and overall configuration of the cell.

7. A power supply as defined in claim 1 wherein each cell has an anode and a cathode and wherein said means for actuating said separate activating means is held in electrical contact with said anode.

8. A power supply as defined in claim 7 wherein said plurality of cells are so arranged that the said cathode of each cell is in electrical contact with the said cathode of all the other cells.

9. The combination as defined in claim 4 wherein a slide guide is secured to said hollow member over said holes and said male member is slidably secured in said guide.

10. The combination as defined in claim 6 wherein said male member is brought into electrical contact with said anode of each said cell when a cell is activated and is withdrawn from contact with said anode of the said cell then active when another cell is to be activated.

11. A power supply comprising:
   a plurality of normally inactive cells each having a cathode and an anode and being so arranged to form a battery of cells in which the said cathode of each cell is electrically coupled to said cathodes of all the other of said plurality of cells;
   separate plunger means associated with each one of said plurality of cells for individually activating each one of said plurality of cells; and
   a single actuating device for actuating, one at a time, said plunger means, said single actuating device being brought into and held in electrical contact with said anode of each said cell when that cell is activated and being removed from electrical contact with said anode of an activated cell when another cell is to be activated whereby only one cell of said plurality of cells has electrical contact established between its anode and said single actuating device at any given time.

References Cited

UNITED STATES PATENTS

| | | | |
|---|---|---|---|
| 2,850,556 | 9/1958 | Hermitte | 136—113 |
| 1,658,142 | 2/1928 | Stamm | 136—114 |
| 2,429,515 | 10/1947 | Hings | 136—162 |
| 2,864,881 | 12/1958 | Doyen | 136—113 |

DONALD L. WALTON, Primary Examiner

U.S. Cl. X.R.

136—181